(12) United States Patent
Takita et al.

(10) Patent No.: US 9,958,901 B2
(45) Date of Patent: May 1, 2018

(54) ELECTRONIC DEVICE

(71) Applicant: FUJITSU LIMITED, Kawasaki-shi, Kanagawa (JP)

(72) Inventors: Hiroyuki Takita, Sapporo (JP); Kazunobu Yoneyama, Kawasaki (JP); Kei Kojima, Kawasaki (JP); Yoshifumi Kajiwara, Sapporo (JP); Toru Koike, Hachioji (JP); Satoru Noma, Hino (JP); Hirohisa Nakabayashi, Kato (JP); Katsumi Adachi, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/592,514

(22) Filed: May 11, 2017

(65) Prior Publication Data
US 2017/0336828 A1 Nov. 23, 2017

(30) Foreign Application Priority Data
May 18, 2016 (JP) .................................. 2016-099859

(51) Int. Cl.
*G06F 1/16* (2006.01)
(52) U.S. Cl.
CPC ............ *G06F 1/1626* (2013.01); *G06F 1/166* (2013.01); *G06F 1/1643* (2013.01); *G06F 1/1656* (2013.01)
(58) Field of Classification Search
CPC ....... G06F 1/1626; G06F 1/1656; G06F 1/166
See application file for complete search history.

(56) References Cited

U.S. PATENT DOCUMENTS

| | | | | |
|---|---|---|---|---|
| 6,870,732 | B2 * | 3/2005 | Huang | G06F 1/1626 220/230 |
| 7,203,058 | B2 * | 4/2007 | Hong | G06F 1/162 248/917 |
| 8,345,411 | B2 * | 1/2013 | Tseng | G06F 1/181 361/679.02 |
| 2005/0257341 | A1 * | 11/2005 | Chen | F16M 11/10 16/17.1 |
| 2008/0074831 | A1 * | 3/2008 | Lee | G06F 1/181 361/679.55 |
| 2009/0231805 | A1 * | 9/2009 | Schlesener | B29C 45/1676 361/679.55 |

(Continued)

FOREIGN PATENT DOCUMENTS

| | | |
|---|---|---|
| JP | 2009-15057 A | 1/2009 |
| JP | 2011-103546 A | 5/2011 |

*Primary Examiner* — Adrian S Wilson
(74) *Attorney, Agent, or Firm* — Westerman, Hattori, Daniels & Adrian, LLP

(57) ABSTRACT

An electronic device equipped with a touch panel provided with, at side surfaces of the housing, first elastic members having a first modulus of elasticity and a first coefficient of friction and contacting a level surface when the electronic device is made to stand in a range from the vertical to 50° and second elastic members having a second modulus of elasticity lower that the first modulus of elasticity and a second coefficient of friction larger than the first coefficient of friction and contacting the level surface when the electronic device is made to lean against a wall from the level surface by an angle of 50° or less, the electronic device thereby prevented from slipping no matter what the range of angle, is provided.

19 Claims, 11 Drawing Sheets

(56) References Cited

U.S. PATENT DOCUMENTS

| | | | |
|---|---|---|---|
| 2009/0268398 A1* | 10/2009 | Tang .................. | G06F 1/1616 |
| | | | 361/679.55 |
| 2010/0149752 A1* | 6/2010 | Lian .................... | G06F 1/1616 |
| | | | 361/679.59 |
| 2011/0228457 A1* | 9/2011 | Moon .................. | G06F 1/1626 |
| | | | 361/679.01 |
| 2015/0212542 A1* | 7/2015 | Wallace ............... | G06F 1/166 |
| | | | 361/679.26 |

* cited by examiner

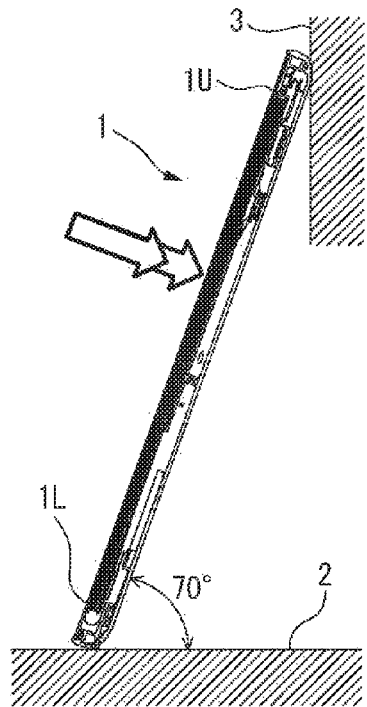
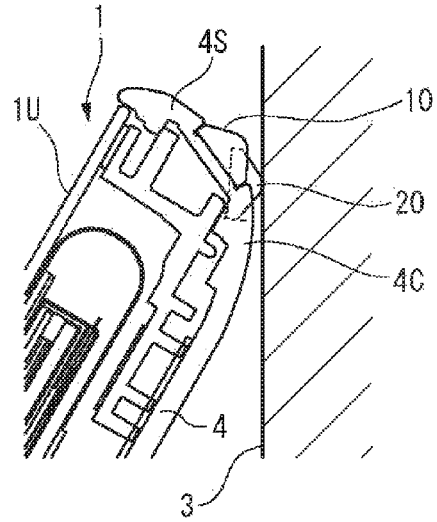
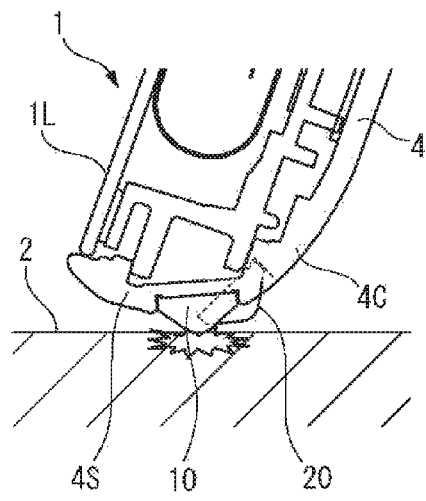
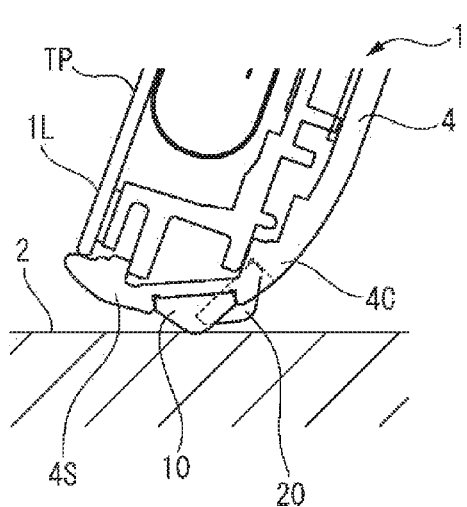

ELECTRONIC DEVICE

CROSS-REFERENCE TO RELATED APPLICATION

This application claims priority from, and incorporates by reference the entire disclosure of, Japanese Patent Application No. 2016-099859, filed on May 18, 2016.

FIELD

The present application relates to an electronic device able to not only be used held by the hand and be used placed on a level surface but also be used leaned against a wall.

BACKGROUND

In recent years, electronic devices provided with touch panels at their display screens, for example, tablet terminals and smart phones, have been spreading. Further, many electronic devices provided with touch panels at their display screens have waterproof specifications. Among the above tablet terminals as well, ones with waterproof specifications have been increasing. Along with the spread of waterproof specification tablet terminals, the opportunities for use of the tablet terminals in bathrooms, kitchens, and other such locations where water is used, travel destinations, and various other places (utilization scenes) have been rising. User demands on tablet terminals have been increasing.

Further, in a tablet terminal provided with a touch panel, images displayed on the screens are moved, enlarged, and reduced, functions are switched, and data is input using the touch panel. The touch panel is operated not only while holding the tablet terminal but also when placing the tablet terminal on a desk top or other level surface or leaning the tablet terminal against a wall.

When trying to perform a touch operation in the state making the tablet terminal lean against the wall, due to the added load of a touch operation on the touch panel, the housing of the tablet terminal leaning against the wall was liable to slip against the bottom surface or the wall surface and the tablet terminal was liable to fall against a flat surface. Therefore, when trying to perform a touch operation in the state making the tablet terminal lean against a wall, the tablet terminal is used while holding it by the hand, is used with a standing-use cover attached, or is used placed on a specialized stand.

FIG. 1A explains the state of use when placing the lower end part 1L of the tablet terminal 1 on a level surface 2 such as a floor surface or desk top surface, increasing the upright angle θ of the upper end part 1U from the level surface 2 to make the terminal lean against the wall 3, and operating the touch panel TP. Further, FIG. 2A explains the state of use when placing the lower end part 1L of the tablet terminal 1 on the level surface 2, reducing the upright angle θ of the tablet terminal 1 from the level surface 2 to make the terminal lie down, making upper end part 1U lean against the wall 3 in that state, and operating the touch panel TP.

In this regard, however, in the state illustrated in FIG. 1A, when performing a touch operation on the touch panel TP, as illustrated in FIG. 1B, the load L due to the touch operation on the touch panel TP is added to its weight. The housing 4 slips against the level surface 2 in the arrow S direction illustrated by the broken line whereby the tablet terminal 1 falls down to the level surface 2. That is, the tablet terminal 1 falls down and strikes the level surface 2. Further, in the state illustrated in FIG. 2A, even when performing a touch T or drag operation D on the touch panel TP illustrated by the arrow, as illustrated in FIG. 2B, the load of the touch T or drag operation D on the touch panel TP is added to the terminal weight, the housing 4 slips against the level surface 2 in the direction illustrated by the arrow illustrated by the broken line whereby the tablet terminal 1 falls against the level surface 2.

In this way, in tablet terminals up to now, the downward load due to the touch operation ended up causing slipping between the contact surface of the housing of the tablet terminal and the level surface and unstable placement of the wall surface tablet terminal. For this reason, in tablet terminals up to now, use in a leaning state was difficult. Further, when using a tablet terminal leaning against a wall, if repeatedly placing the lower end part of the tablet terminal in a hard manner against the level surface, the housing at the lower end part of the tablet terminal contacting the level surface was liable to be damaged.

SUMMARY

In one aspect, there is provided an electronic device enabling use in a state leaning against a wall without the housing slipping against the level surface even if operating a touch panel provided at the electronic device in a state where a lower end part of the housing is placed on a level surface and an upper end part is made to lean against a wall.

According to one aspect, there is provided an electronic device provided with a touch panel, the electronic device comprising, at a housing, first elastic members having a first modulus of elasticity and a first coefficient of friction and contacting a level surface when the electronic device is made to stand in a range from the vertical to a first angle and second elastic members having a second modulus of elasticity lower that the first modulus of elasticity and a second coefficient of friction larger than the first coefficient of friction and contacting the level surface when the electronic device is made to stand by an angle of the first angle or less.

BRIEF DESCRIPTION OF DRAWINGS

FIG. 7A is a side cross-sectional view illustrating the state where the tablet terminal to which the elastic members of the first embodiment are attached is made to lean against a wall with a large upright angle from the level surface.

FIG. 7B is an enlarged cross-sectional view of a part illustrating contact of the upper end part of the tablet terminal illustrated in FIG. 7A with a wall.

FIG. 7C is a partial enlarged cross-sectional view illustrating the state where the tablet terminal illustrated in FIG. 7A strikes the level surface.

FIG. 7D is a partial enlarged cross-sectional view illustrating contact of the lower end part of the tablet terminal illustrated in FIG. 7A with the level surface.

DESCRIPTION OF EMBODIMENTS

Below, the attached drawings will be used to explain embodiments of the present application based on specific examples. Note that in the embodiments explained below, as a representative example of an electronic device provided with a touch panel, a tablet terminal will be explained, but the electronic device provided with a touch panel is not limited to a tablet terminal. Further, the tablet terminal explained below will be explained with the same reference notations assigned to the tablet terminal of the comparative art explained in FIG. 1A, FIG. 1B, and FIG. 2A and FIG. 2B and its housing, level surface, and wall.

Figure 1A:
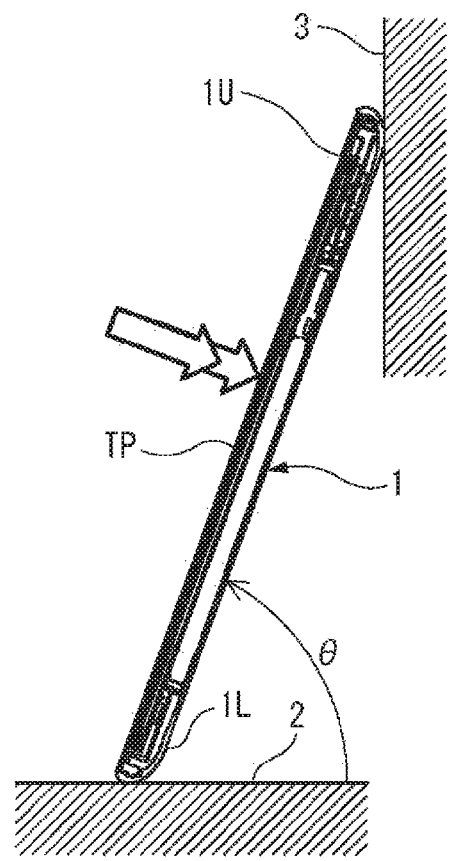
FIG. 1A is a side cross-sectional view illustrating the state where a tablet terminal is made to lean against a wall with a large upright angle from the level surface.
Figure 1B:
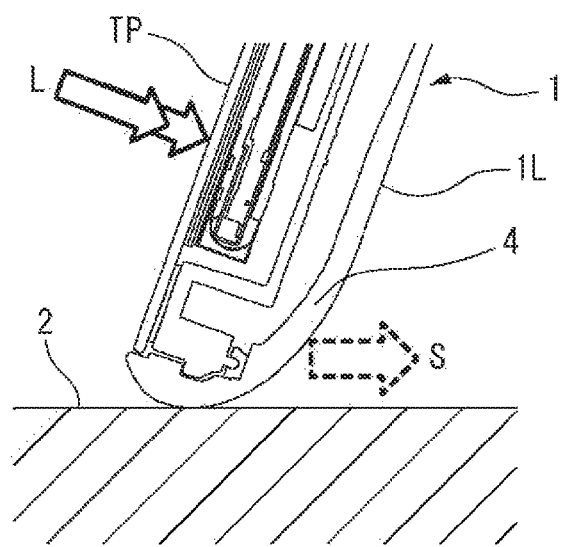
FIG. 1B is an enlarged cross-sectional view of a part of the tablet terminal illustrated in FIG. 1A.
Figure 2A:
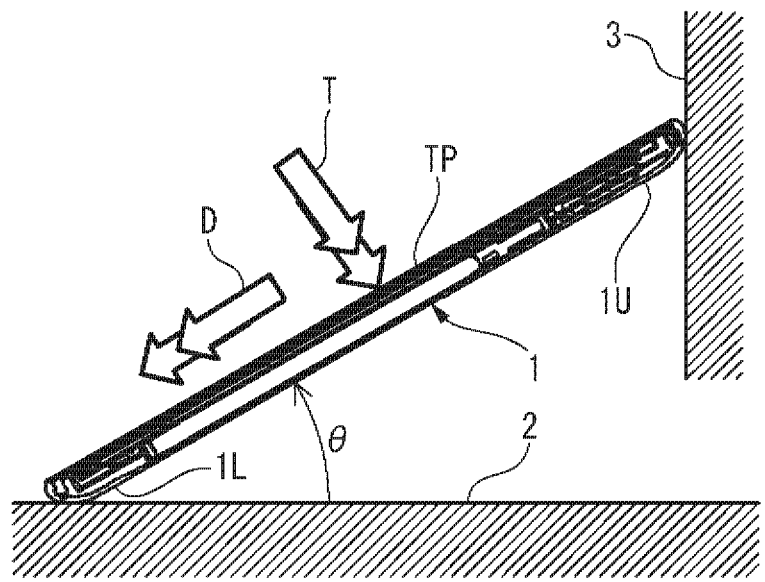
FIG. 2A is a side cross-sectional view illustrating the state where the tablet terminal is made to lean against a wall with a small upright angle from the level surface.
Figure 2B:
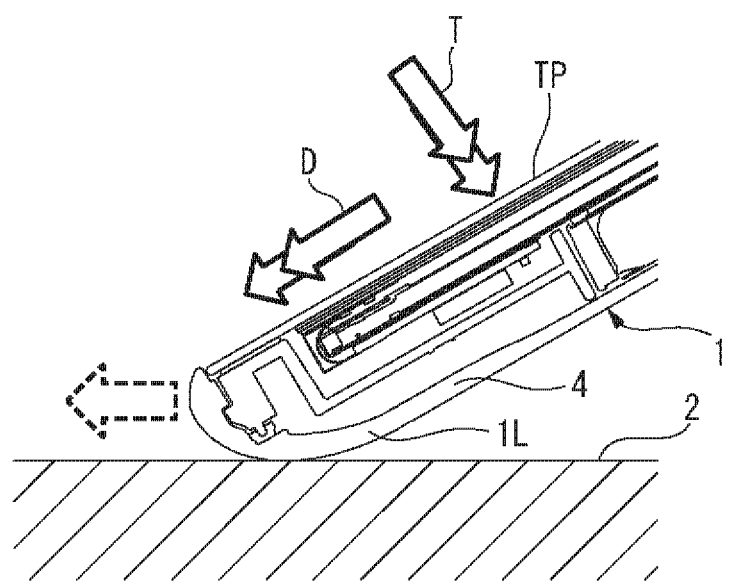
FIG. 2B is an enlarged cross-sectional view of a part of the tablet terminal illustrated in FIG. 2A.
Figure 3A:
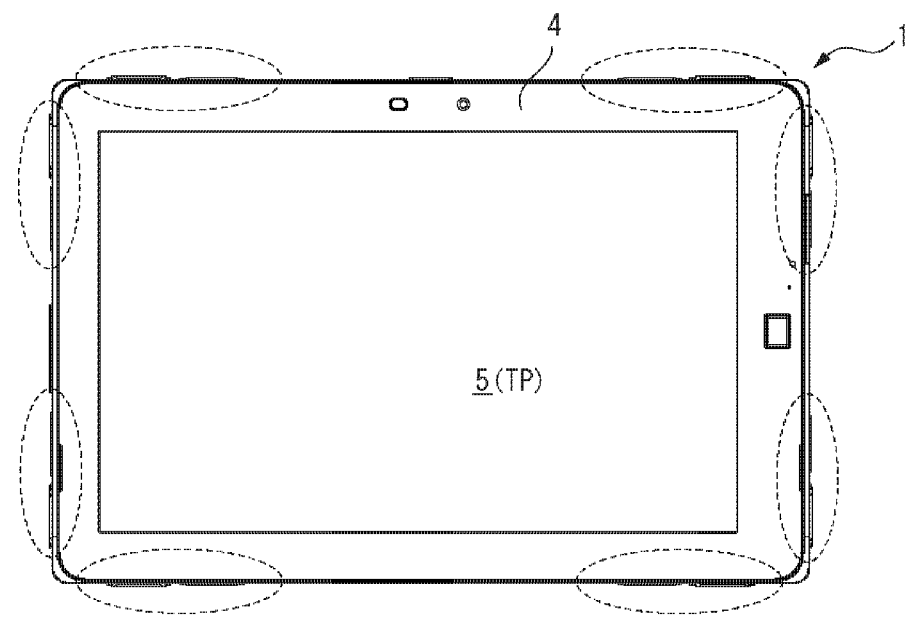
FIG. 3A is a front view of the disclosed tablet terminal to which elastic members are attached.

FIG. 3A illustrates a tablet terminal 1 as a representative example of an electronic device covered by the present application and is a view of the tablet terminal 1 seen from the front side. At the front side of the tablet terminal 1, there is a display screen 5 provided with a touch panel TP. The housing 4 of the tablet terminal 1 disclosed has elastic members attached at the positions illustrated by broken lines at the end parts of the housing surrounding the display screen 5 (four peripheral side parts) so as to stop slipping of the housing when leaning the tablet terminal 1 against a wall.

Figure 3B:
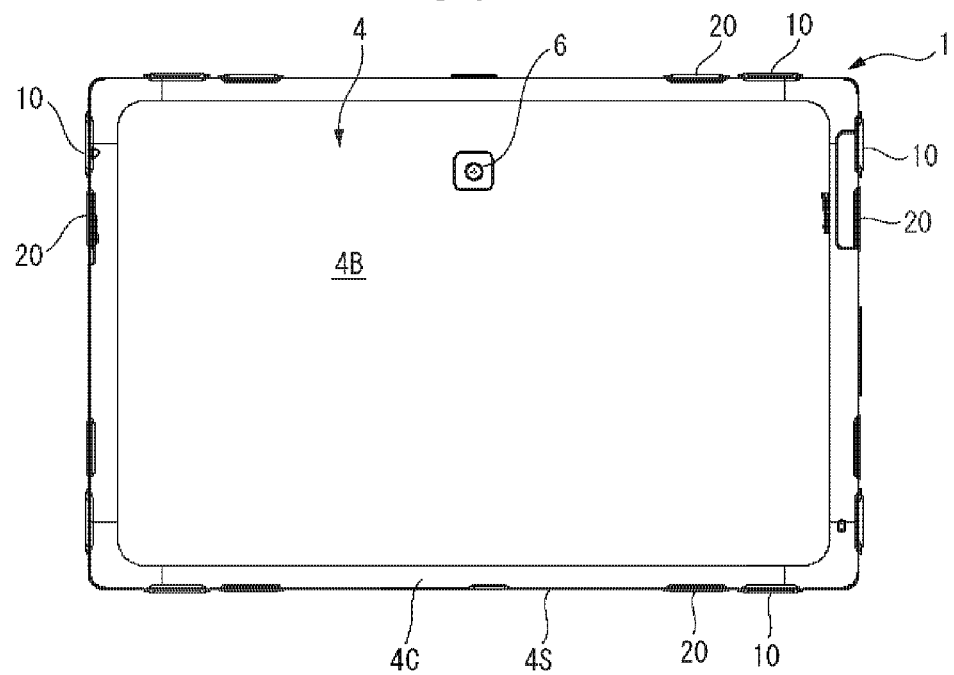
FIG. 3B is a bottom surface view of the tablet terminal illustrated in FIG. 3A.

FIG. 3B is a view of the tablet terminal 1 illustrated in FIG. 3A seen from the bottom surface 4B side. At the bottom surface of the housing 4 of the tablet terminal 1, a camera 6 is provided. Further, the parts from the end parts of the bottom surface 4B of the housing 4 of the tablet terminal 1 to the four side surfaces 4S of the housing 4 form inclined surfaces 4C inclined toward the side surfaces 4S. Further, the parts of the side surfaces 4S and the inclined surfaces 4C (below, the parts comprised of the inclined surfaces 4C plus parts of the side surfaces 4S being referred to as "boundary part") are provided with elastic members comprised of the first elastic members 10 and second elastic members 20. The first elastic members 10 are positioned at the side surface sides of the boundary parts, while the second elastic members 20 are provided adjoining the first elastic members 10 at the inclined surface sides of the boundary parts. An embodiment in which the first elastic members 10 are arranged at adjoining sides of the different sides and in which the second elastic members 20 are arranged at the center sides of the side surfaces is made a first embodiment of the elastic member.

Figure 4A:
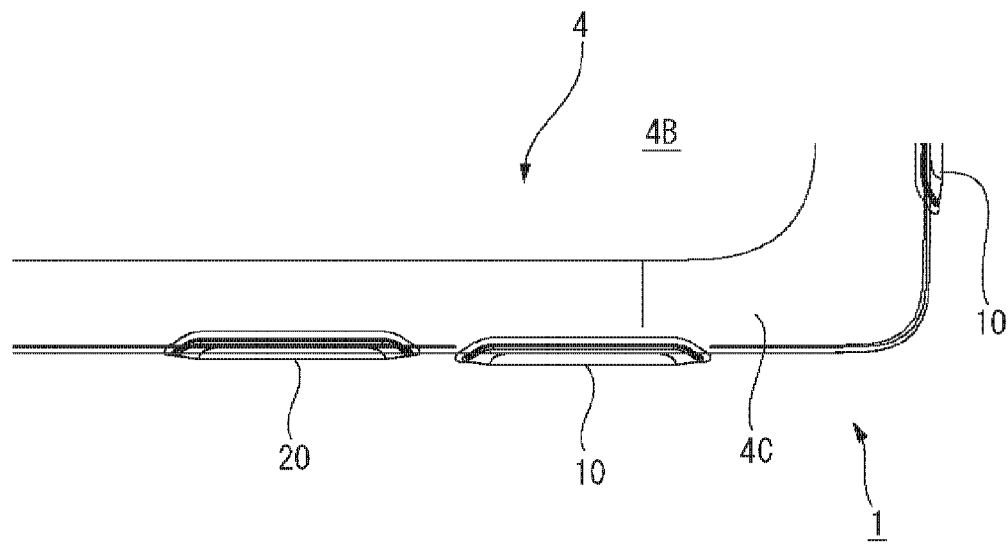
FIG. 4A is an enlarged plan view of a part of the tablet terminal illustrated in FIG. 3B.

FIG. 4A is a partial plan view illustrating enlarged a part of the tablet terminal 1 illustrated in FIG. 3B. Specifically, the bottom right part of the tablet terminal 1 illustrated in FIG. 3B is illustrated enlarged in FIG. 4A. As explained above, the first elastic members 10 are provided at the adjoining sides of the different sides, while the second elastic members 20 are provided adjoining the first elastic members 10 at the centers of the sides. On the other hand, the first elastic members 10 and second elastic members 20 form elongated shapes. While adjoining each other, they are not at the same positions in the long directions of the sides. They are shifted (offset) in the short directions of the sides. This state will be explained using FIG. 4B.

Figure 4B:
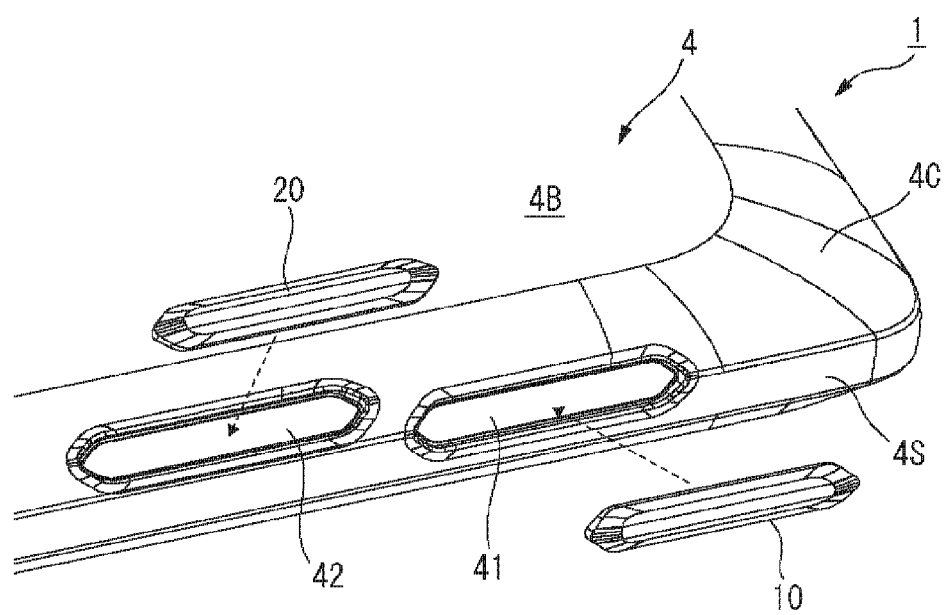
FIG. 4B is a partial disassembled perspective view illustrating a step of attaching elastic members to a part illustrated in FIG. 4A.

FIG. 4B shows the state before a first elastic member 10 and second elastic member 20 illustrated in FIG. 4A are attached to the housing 4. That is, FIG. 4B is a partial disassembled perspective view illustrating a step of attaching a first elastic member 10 and a second elastic member 20 to the housing 4. In the first embodiment, at each boundary part of the housing 4, a first recessed part 41 for attaching a first elastic member 10 and a second recessed part 42 for attaching a second elastic member 20 are provided. In the first embodiment, the bottom surface of the first elastic member 10 and the bottom surface of the second elastic member 20 are flat surfaces as explained later, so the bottom surfaces of the first recessed part 41 and the second recessed part 42 are also flat surfaces.

The first recessed part 41 which is provided at the side where the side surfaces intersect is provided at a position straddling the side surface 4S and inclined surface 4C of the housing 4. On the other hand, the second recessed part 42 is provided at the inclined surface 4C at a center side of each side surface 4S. The first elastic member 10 is attached to the first recessed part 41, while the second elastic member 20 is attached to the second recessed part 42. The first and second elastic members 10, 20 can be attached to the first and second recessed parts 41, 42 by two-sided tape or by a binder.

Further, the first elastic member 10 attached to the first recessed part 41 mainly contacts the level surface 2 when the tablet terminal 1 is used standing on the level surface 2 in a range of a large upright angle from the level surface 2 from the vertical to an angle of about 50°. Conversely, the second elastic member 20 attached to the second recessed part 42 mainly contacts the level surface 2 when the tablet terminal 1 is used standing on the level surface 2 in a range of a small upright angle from the level surface 2 from an angle of about 50° to about 20°.

When the tablet terminal 1 is made to stand on the level surface 2 in a range of a large upright angle from the level surface 2 from the vertical to an angle of about 50°, the force of the load of the tablet terminal 1 acting in the horizontal direction at the contact surface of the tablet terminal 1 with the level surface 2 is small. Accordingly, the force applied to the contact surface of the tablet terminal 1 with the level surface 2 causing the housing 4 to slip in the horizontal direction is small. For this reason, when the tablet terminal 1 is made to stand on the level surface 2 in a range of a large upright angle from the level surface 2, a large frictional force for stopping slipping of the housing 4 in the horizontal direction is unnecessary for the first elastic member 10 mainly contacting the level surface 2. On the other hand, as explained above, when the tablet terminal 1 is made to stand on the level surface 2 in a range of a large upright angle from the level surface 2, the lower end part 1L of the tablet terminal 1 is often placed in a hard manner on the level surface 2 and impact is easily given to the housing 4. Therefore, a material with a higher modulus of elasticity than the coefficient of friction should be employed for the first elastic member 10.

Conversely, if the tablet terminal 1 is used standing on the level surface 2 in a range of a small upright angle from the level surface 2 from an angle of about 20° to about 50°, the force of the load of the tablet terminal 1 acting in the horizontal direction at the contact surface of the tablet terminal 1 with the level surface 2 is large. Accordingly, the force applied to the contact surface of the tablet terminal 1 with the level surface 2 causing the housing 4 to slip in the horizontal direction is large. For this reason, when the tablet terminal 1 is made to stand on the level surface 2 in a range of a small upright angle from the level surface 2, a large frictional force for stopping slipping of the housing 4 in the horizontal direction is necessary for the second elastic member 20 mainly contacting the level surface 2. On the other hand, when the tablet terminal 1 is made to stand on the level surface 2 in a range of a small upright angle from the level surface 2, the lower end part 1L of the tablet terminal 1 is seldom placed in a hard manner on level surface 2. Therefore, a material with a higher coefficient of friction than the modulus of elasticity should be employed for the second elastic member 20.

As the first elastic member 10, a material with a higher modulus of elasticity than the coefficient of friction should be employed. Therefore, as the first elastic member 10, in the present embodiment, a thermoplastic polyester elastomer (for example, Hytrel® made by Toray-Dupont) can be used. Further, as the second elastic member 20, a material with a low modulus of elasticity and a high coefficient of friction should be employed. Therefore, as the second elastic member 20, in the present embodiment, polyurethane (for example, Bumpon® made by 3M) or silicone rubber etc. may be used.

Figure 5A:
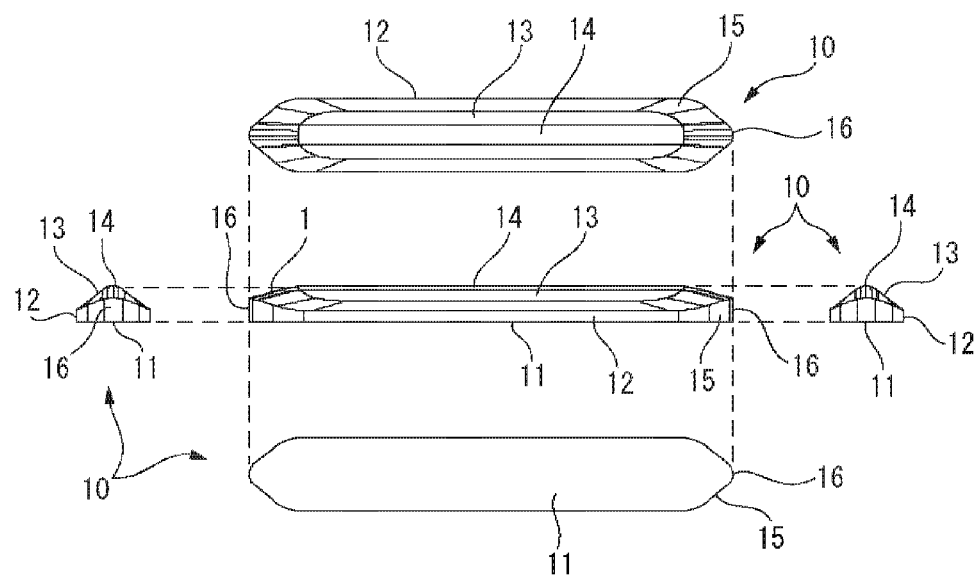
FIG. 5A is a five surface view including a plan view, front view, bottom view, and left and right side views of the first embodiment of the elastic members attached to the tablet terminal.
Figure 5B:
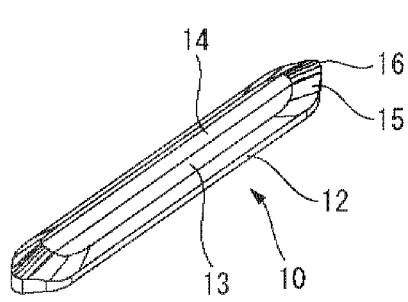
FIG. 5B is a perspective view of an elastic member illustrated in FIG. 5A seen from the top side.

FIG. 5A is a front view of a first embodiment of an elastic member attached to a tablet terminal and illustrates a bottom view and left and right side views. Note that the first elastic member 10 and the second elastic member 20 explained in FIG. 4B may be made completely the same shapes, so in FIG. 5A, the shape of the first elastic member 10 will be explained as a representative example. FIG. 5B is a perspective view of the first elastic member 10 illustrated in FIG. 5A seen from the top side, while FIG. 5C is a perspective view of the first elastic member 10 illustrated in FIG. 5A seen from the bottom side.

Figure 5C:
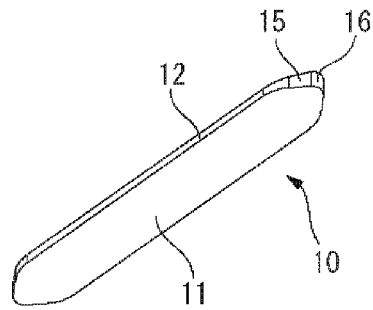
FIG. 5C is a perspective view of an elastic member illustrated in FIG. 5A seen from the bottom side.

As illustrated in FIG. 5A to FIG. 5C, the first elastic member 10 is elongated in shape. The two end parts are projecting shapes while the bottom surface 11 becomes a flat surface. At the opposite side of the first elastic member 10 from the bottom surface 11, there are side surfaces 12 running along the first elastic member 10 in the long direction and rising up from the two sides of the bottom surface 11 and inclined surfaces 13 inclined from the upper end parts of the side surfaces 12 in the inward direction. The upper end parts of the inclined surfaces 13 are connected by a curved surface 14 to the opposite side inclined surfaces 13. The two end parts of the curved surface 14 in the long direction are connected through inclined surfaces 15 to curved end faces 16 positioned at the first elastic member 10 at the two end parts. The inclined surfaces 13 and the curved end faces 16 form ridgelines in the long direction of the first elastic member 10. The opposite side of the first elastic member 10 from the bottom surface 11 forms a projecting ridge as a whole. As explained above, the second elastic member 20 is the same shape as the first elastic member 10. Further, the inclined surfaces 13 may also be curved.

The shape of the first elastic member 10 illustrated from FIG. 5A to FIG. 5C is one example. The first elastic member 10 and second elastic member 20 are not particularly limited in shapes so long as shapes whether either of the elastic members contact the level surface of the tablet terminal when making the tablet terminal lean against the wall. Further, in the above-mentioned embodiment, the first elastic member 10 and second elastic member 20 are attached to recessed parts provided at the housing of the tablet terminal. However, in a tablet terminal without recessed parts, the first elastic member 10 and second elastic member 20 may be attached to the surface of the housing of the tablet terminal by direct bonding.

Next, the functions of the first elastic member 10 and the second elastic member 20 when the first elastic member 10 and the second elastic member 20 of the first embodiment are attached and the tablet terminal 1 is placed vertical to the level surface 2 or inclined from it will be explained.

Figure 6A:
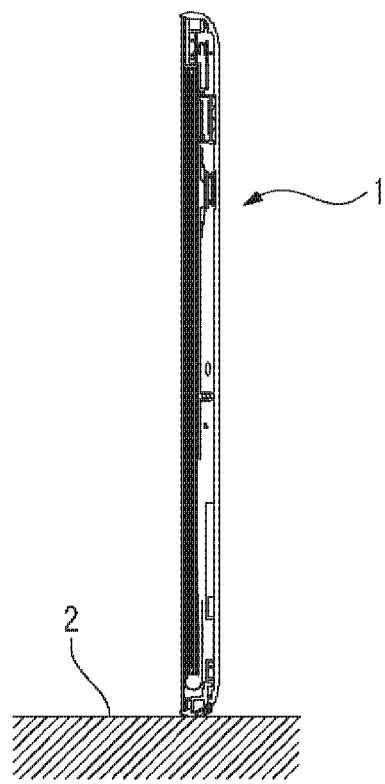
FIG. 6A is a side cross-sectional view of the state where the tablet terminal to which the elastic members of the first embodiment are attached is made to stand vertically on the level surface.
Figure 6B:
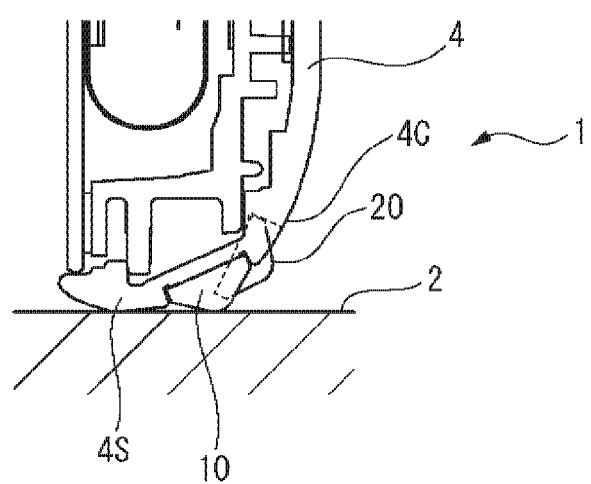
FIG. 6B is an enlarged cross-sectional view of a part illustrating contact of the lower end part of the tablet terminal illustrated in FIG. 6A with the level surface.

First, FIG. 6A illustrates the state where the tablet terminal 1 to which the elastic members of the first embodiment are attached is made to stand vertically on the level surface 2. In the state where the tablet terminal 1 is made to stand vertically on the level surface 2, the side surface 4S of the housing 4 of the tablet terminal 1 mainly contacts the level surface 2 like in the enlarged cross-sectional view illustrated in FIG. 6B. Further, the first elastic member 10 provided at a position of the housing 4 straddling the side surface 4S and inclined surface 4C contacts the level surface 2, but the load applied from the tablet terminal 1 to the level surface 2 is received by the side surface 4S of the housing 4. Further, the second elastic member 20 provided at the inclined surface 4C of the housing 4 does not contact the level surface 2.

FIG. 7A illustrates the state where the tablet terminal 1 to which the elastic members of the first embodiment are attached is made to lean against the wall 3 in the state where the upright angle with respect to the level surface 2 is large. Here, for example, the upright angle of the tablet terminal 1 with respect to the level surface 2 is made 70°. Further, FIG. 7B illustrates contact of the upper end part 1U of the tablet terminal 1 illustrated in FIG. 7A against the wall 3, while FIG. 7C and FIG. 7D illustrates contact of the lower end part 1L of the tablet terminal 1 illustrated in FIG. 7A and the level surface 2. In particular, FIG. 7C explains the functions of the first elastic member 10 when the tablet terminal 1 is placed in a hard manner on the level surface 2.

When the tablet terminal 1 is made to lean against the wall 3 by a large upright angle with respect to the level surface 2, for example, 70°, the lower end part 1L of the tablet terminal 1 is sometimes placed in a hard manner against the level surface 2. In such a case, as illustrated in FIG. 7C, the first elastic member 10 strikes the level surface 2 in a hard manner. However, the first elastic members 10, as explained above, are formed by a material with a large modulus of elasticity, so even when the lower end part 1L of the tablet terminal 1 is placed in a hard manner against the level surface 2, the impact can be absorbed by the first elastic members 10. As a result, even if the tablet terminal 1 is made to stand by a large upright angle from the level surface 2, the impact is absorbed by the first elastic members 10 and protection of the lower end part 1L of the tablet terminal 1 and prevention of damage to the electronic devices inside of the housing 4 can be realized.

Further, when the tablet terminal 1 is made to lean against the wall 3 in the state illustrated in FIG. 7A from the level surface 2, at the upper end part 1U of the tablet terminal 1, as illustrated in FIG. 7B, the second elastic members 20 contact the wall 3, while the first elastic members 10 do not contact the wall 3. Further, at the lower end part 1L of the tablet terminal 1, as illustrated in FIG. 7D, the first elastic members 10 contact the level surface 2 to hold the tablet terminal 1 in position, while the side surface 4S and second elastic members 20 of the housing 4 do not contact the level surface 2. In this state, the frictional forces due to the first elastic members 10 act on the level surface 2 and the frictional forces due to the second elastic members 20 act on the wall 3, so frictional forces are generated at both the level surface 2 and the wall 3 and the housing 4 of the tablet terminal 1 can be held in place. As a result, even if the touch panel TP of the tablet terminal 1 is operated and a downward load acts on the tablet terminal 1, due to the first elastic members 10 and the second elastic members 20, the tablet terminal 1 is resistant to slipping against the level surface 2 and the wall 3 and a stable holding force can be maintained.

Figure 8A:
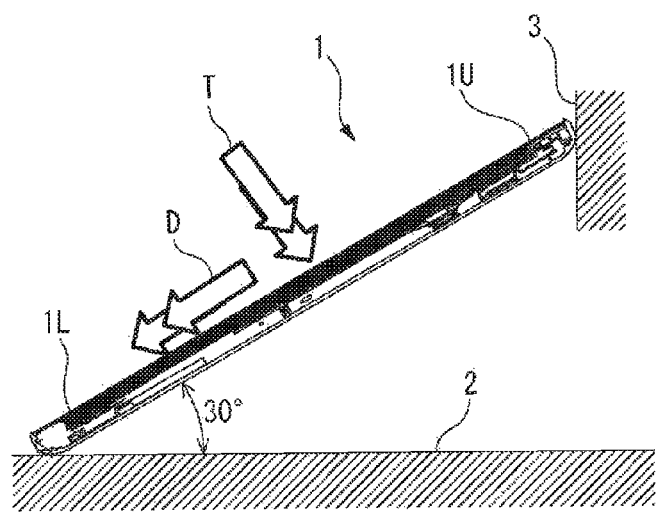
FIG. 8A is a side cross-sectional view illustrating the state where the tablet terminal to which the elastic members of the first embodiment are attached is made to lean against a wall with a small upright angle from the level surface.

FIG. 8A illustrates the state where the tablet terminal 1 to which the elastic members of the first embodiment are attached is made to lean against the wall 3 in a state with a small upright angle from the level surface 2. Here, for example, the upright angle of the tablet terminal 1 with respect to the level surface 2 is made 30°. Further, FIG. 8B illustrates the contact of the lower end part 1L of the tablet terminal 1 illustrated in FIG. 8A with the level surface 2, while FIG. 8C illustrates the contact of the upper end part 1U of the tablet terminal 1 illustrated in FIG. 8A with the wall 3.

Figure 8B:
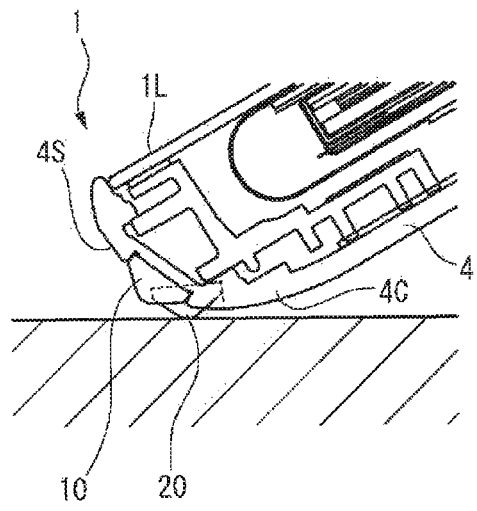
FIG. 8B is a partial enlarged cross-sectional view illustrating contact of the lower end part of the tablet terminal illustrated in FIG. 8A with the level surface.
Figure 8C:
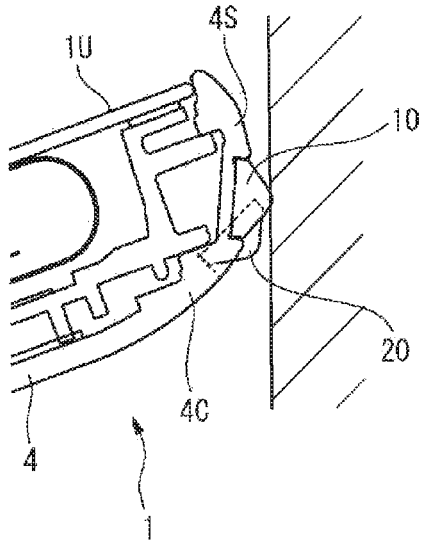
FIG. 8C is a partial enlarged cross-sectional view illustrating contact of the upper end part of the tablet terminal illustrated in FIG. 8A with a wall.

When the tablet terminal 1 is made to lean against the wall 3 in the state illustrated in FIG. 8A from the level surface 2, at the lower end part 1L of the tablet terminal 1, as illustrated in FIG. 8B, the second elastic members 20 contact the level surface 2 and hold the tablet terminal 1 in place. In this state, the side surface 4S of the housing 4 and the first elastic members 10 do not contact the level surface 2. Further, at the upper end part 1U of the tablet terminal 1, as illustrated in FIG. 8C, the first elastic members 10 contact the wall 3 while the second elastic members 20 do not contact the wall 3. Further, in this state, the strong frictional forces due to the second elastic members 20 act on the level surface 2 and the frictional forces due to the first elastic members 10 act on the wall 3, so frictional forces are caused both at the level surface 2 and at the wall 3 and the housing 4 of the tablet terminal 1 can be held in place. As a result, even if the touch panel TP of the tablet terminal 1 is operated and a downward load acts on the tablet terminal 1, the first and second elastic members 10, 20 can be used to make the tablet terminal 1 resistant to slipping against the level surface 2 and enable a stable holding force to be maintained.

In this way, no matter by what upright angle the tablet terminal 1 to which the elastic members (first elastic members 10 and second elastic members 20) of the first embodiment are attached is made to stand with respect to the level surface 2 and the wall 3, the lower end part 1L is resistant to slipping against the level surface 2. Accordingly, it is possible to perform a stable touch operation or drag operation (operation for making image move often performed when upright angle of tablet terminal is small) on the tablet terminal 1 equipped with a touch panel.

Figure 9:
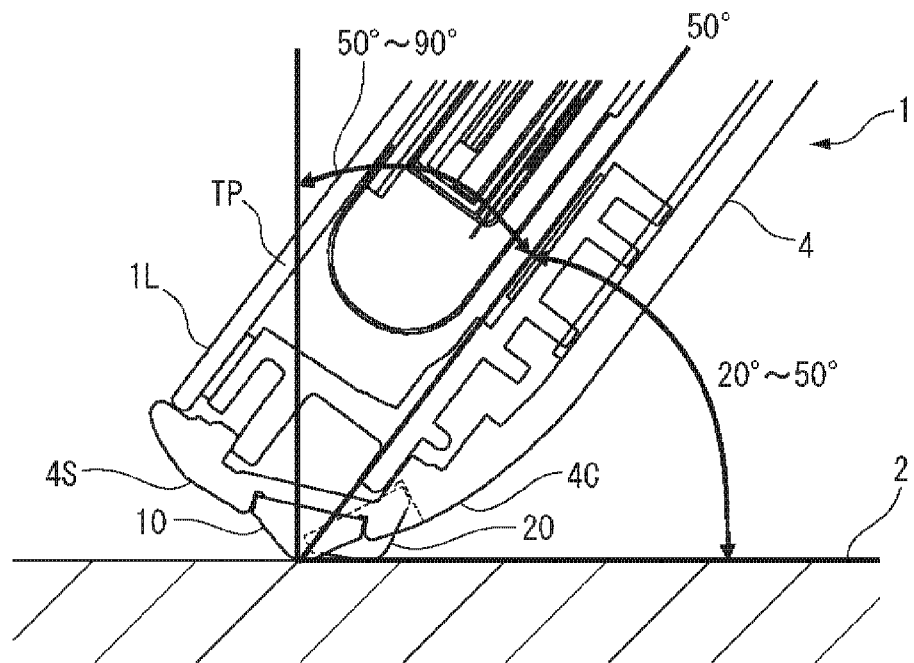
FIG. 9 is an explanatory view explaining the switching of contact angles of two types of elastic members attached to the tablet terminal corresponding to inclinations of the tablet terminal.

In the first embodiment, due to the provision of the first and second recessed parts 41, 42 provided at the housing 4, the first elastic members 10 contact the level surface 2 when the inclination of the tablet terminal 1 is in the range of the vertical to 50° and the second elastic members 20 contact the level surface 2 when it is in the range of 50° to 20°. FIG. 9 illustrates the arrangement of the first and second elastic members 10, 20 at the housing 4 in the case where the contact of the first and second elastic members 10, 20 attached to the tablet terminal 1 with respect to the provision surface 2 switches at an inclined angle of the tablet terminal 1 of 50°. When contact of the first and second elastic members 10, 20 with the level surface 2 switches when the inclined angle of the tablet terminal 1 is 50°, the first and second elastic members 10, 20 evenly contact the level surface 2 when the inclined angle of the tablet terminal 1 is 50°.

However, the angle of switching of contact of the first and second elastic members 10, 20 attached to the tablet terminal 1 with the level surface 2 is not limited to 50° and can be changed in accordance with the shape of the side surface of the tablet terminal 1. Further, when making the angle of switching of contact of the first and second elastic members 10, 20 with the level surface 2 another angle, for example, 45°, the first and second elastic members 10, 20 should be arranged so that they evenly contact the level surface 2 when the inclined angle of the tablet terminal 1 is 45°.

Furthermore, the side of the tablet terminal 1 provided with the first and second elastic members 10, 20 differs depending on in what orientation the tablet terminal 1 is placed to view the display overlaid on the touch panel provided at the tablet terminal 1. Therefore, if all of the four sides of the tablet terminal 1 can be placed on the level surface 2, the first and second elastic members 10, 20 should be attached to all of the four sides of the tablet terminal 1. Further, the number of the first and second elastic members 10, 20 attached to each side of the tablet terminal 1 is not limited to two. Further, in the first embodiment, the first elastic members 10 were arranged at the adjoining sides of the different sides while the second elastic members 20 were arranged at the center parts of the different sides, but it is also possible to arrange the first elastic members 10 at the center parts of the different sides at the different sides and the second elastic member 20 at the adjoining sides of the different sides.

Figure 10:
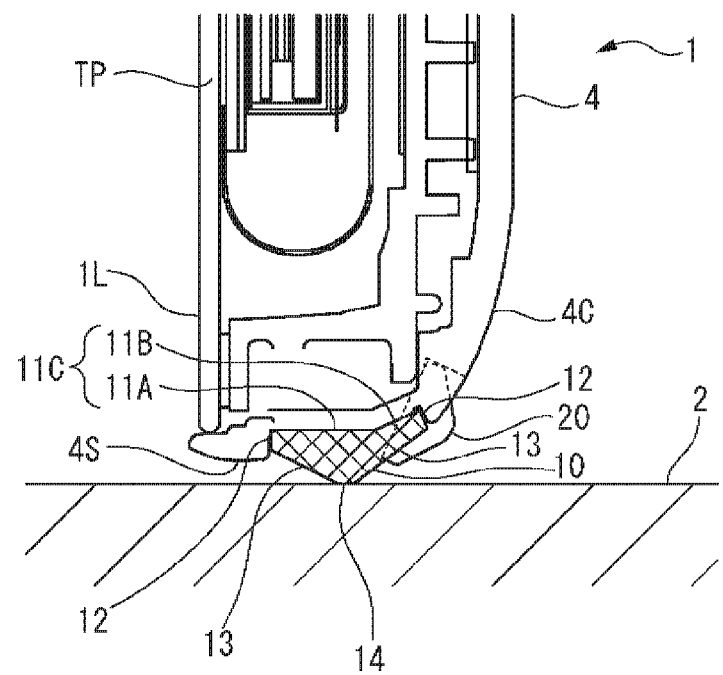
FIG. 10 is a partial enlarged cross-sectional view of a lower end part of the tablet terminal illustrating an embodiment in which one of the two types of elastic members attached to the tablet terminal is wrapped around to a side surface of the housing.

Further, in the first embodiment, the bottom surfaces of the first and second elastic members 10, 20 were flat surfaces, but as illustrated in FIG. 10, a modification in which one of the two types of elastic members attached to the tablet terminal 1, for example, the first elastic members 10, are wrapped around the side surface 4S of the housing 4 is also possible. In the embodiment illustrated in FIG. 10, to wrap a first elastic member 10 around the side surface 4S of the housing 4, the first elastic member 10 is formed with a composite bottom surface 11C provided with a first bottom surface 11A and second bottom surface 11B.

On the other hand, in the case of the modification, the first bottom surface 11A forming the composite bottom surface 11C is a flat surface extending in the long direction of the side surface 12S, while the second bottom surface 11B is a flat surface connected with the first bottom surface 11A at an obtuse angle. Further, at the opposite side of the composite bottom surface 11C, the two sides of the composite bottom surface 11C in the long direction have side surfaces 12. The inclined surfaces 13 adjoining the side surfaces 12 are connected with them by the curved surfaces 14. In the modification, when making the tablet terminal 1 stand in the vertical direction with respect to the level surface 2, the curved surfaces 14 of the first elastic members 10 contact the level surface 2. The side surface 4S of the housing 4 and the second elastic members 20 both do not contact the level surface 2. For this reason, in the modification, the impact received from the level surface 2 when the tablet terminal 1 is made to stand vertically on the level surface 2 is absorbed by the first elastic members 10. The functions of the first elastic members 10 in the modification when standing up the tablet terminal 1 on the level surface 2 are the same as the first embodiment.

In the first embodiment, the elastic members attached to the tablet terminal 1 were comprised of separate first elastic members 10 and second elastic members 20. Further, the housing 4 of the tablet terminal 1 was provided with the first and second recessed parts 41, 42 so that the first elastic members 10 contacted the level surface 2 when the inclination of the tablet terminal 1 was in the range of the vertical to 50° and the second elastic members 20 contacted the level surface 2 when it was in the range of 50° to 20°. On the other hand, the first elastic members 10 and the second elastic members 20 can be formed as integral composite elastic members 30 by two-color molding as a second embodiment. In the second embodiment, the first elastic members 10 and the second elastic members 20 are joined in the state aligned in the short direction. In the second embodiment as well, the first elastic members 10 contact the level surface 2 when the inclination of the tablet terminal 1 was in the range of the vertical to 50°, while the second elastic members 20 contact the level surface 2 when it is in the range of 50° to 20°.

Figure 11A:
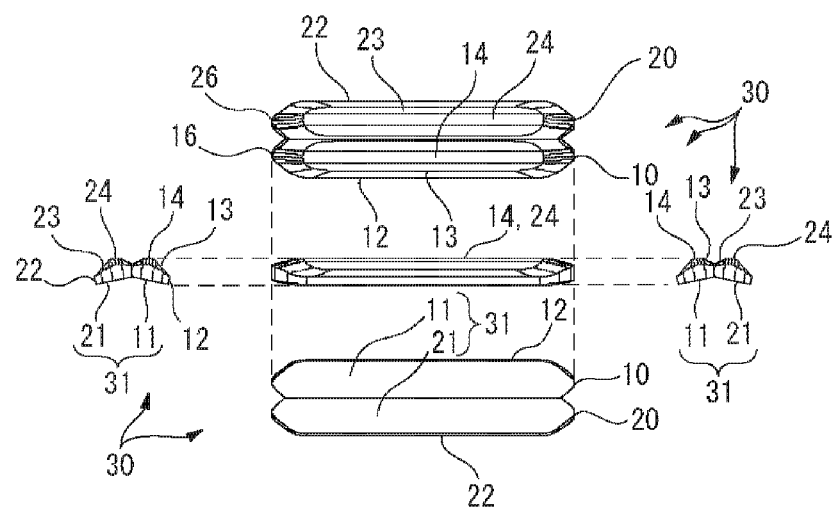
FIG. 11A is a five surface view including a plan view, front view, bottom view, and left and right side views of a second embodiment of the elastic members attached to the tablet terminal.
Figure 11B:
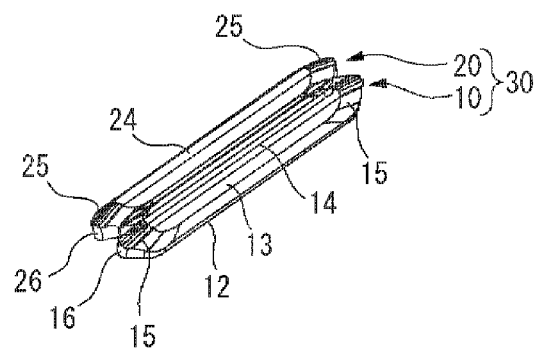
FIG. 11B is a perspective view of the elastic member illustrated in FIG. 11A seen from the top side.
Figure 11C:
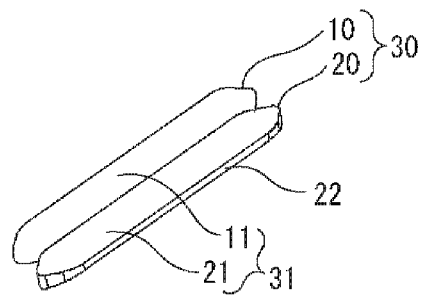
FIG. 11C is a perspective view of the elastic member illustrated in FIG. 11A seen from the bottom side.

FIG. 11A illustrates a plan view, front view, bottom view, and left and right side views of a composite elastic member 30 of the second embodiment of the elastic members attached to the tablet terminal. Further, FIG. 11B is a perspective view of the elastic member 30 illustrated in FIG. 11A seen from the top side, while FIG. 11C is a perspective view of the composite elastic member 30 illustrated in FIG. 11A seen from the bottom side. The composite elastic member 30 is comprised of a first elastic member 10 and a second elastic member 20 integrally formed by two-color molding. The bottom surface 31 is shaped from the bottom surface 11 of the first elastic member 10 and the bottom surface 21 of the second elastic member 20 connected adjoining each other.

At the opposite side of the composite elastic member 30 from the bottom surface 31, there are side surfaces 12, 22 rising upward from the sides of bottom surfaces 11, 21 of the first and second elastic members 10, 20 not adjoining each other. At the upper end parts of the side surfaces 12, 22, inclined surfaces 13, 23 are connected. The end parts of the inclined surfaces 13, 23 are folded back at the curved surfaces 14, 24. The inclined surface 13 is connected to the curved surface 14, while the inclined surface 23 is connected to the curved surface 24. The adjoining inclined surfaces 13, 23 intersect at the boundary part of the first and second elastic members 10, 20. Further, the two end parts of the curved surfaces 14, 24 in the long direction are respectively connected through the inclined surfaces 15, 25 to the curved end faces 16 positioned at the two end parts of the first elastic member 10 and to the curved end faces 26 positioned at the two end parts of the second elastic member 20. The curved surface 14 forms the ridgeline connected to the first elastic member 10 in the long direction, while the curved surface 24 forms the ridgeline connected to the second elastic member 20 in the long direction. As a result, the opposite side to the composite elastic member 30 from the bottom surface 31 is formed with two parallel projecting ridges.

Figure 12:
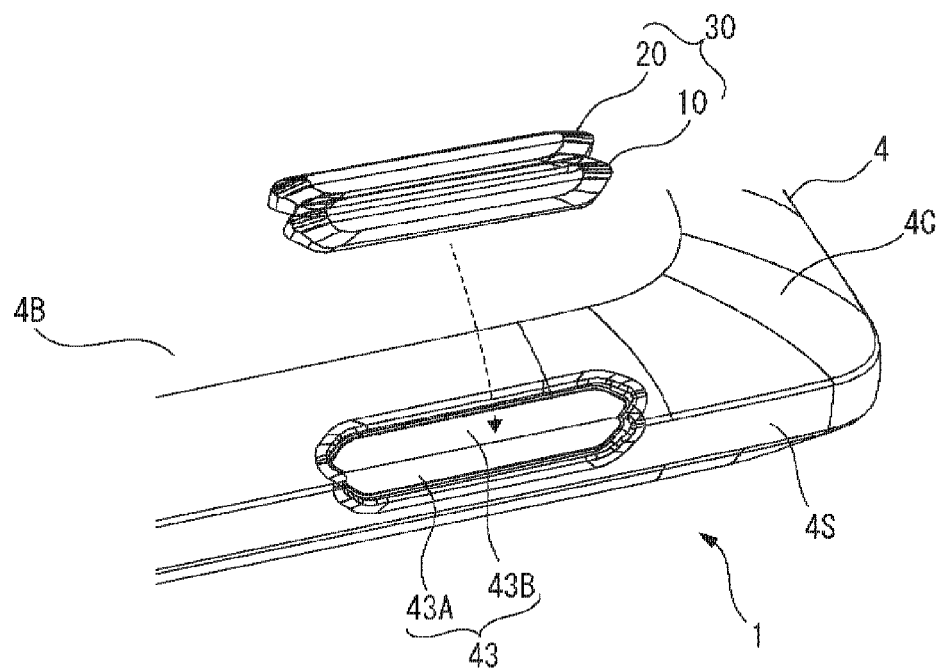
FIG. 12 is a partial disassembled perspective view illustrating a step of attaching elastic members of the second embodiment illustrated in FIG. 11 to a tablet terminal.

FIG. 12 illustrates the process of attaching a composite elastic member 30 of the second embodiment comprised of a first elastic member 10 and second elastic member 20 integrally joined to the housing 4 of the tablet terminal 1. In the first embodiment, a boundary part (inclined surface 4C) of a side surface 4S and bottom surface 4B of the sides of the housing 4 were provided with a first recessed part 41 for attaching a first elastic member 10 and a second recessed part 42 for attaching a second elastic member 20. On the other hand, in the second embodiment, the boundary part (inclined surface 4C) of a side surface 4S and bottom surface 4B of the sides of the housing 4 were provided with a single recessed part 43 for attaching a composite elastic member 30. The recessed part 43 is provided with a flat first bottom surface 43A and a flat second bottom surface 43B corresponding to the shape of the bottom surface 31 of the composite elastic member 30. The first bottom surface 43A and the second bottom surface 43B intersect in a peak corresponding to the shape of the bottom surface 31 of the composite elastic member 30.

At the recessed part 43 provided at the side of the housing 4, the first bottom surface 43A is provided at a part of one side surface 4S of the housing 4, while the second bottom surface 43B is provided at the part of the inclined surface 4C of each side. The composite elastic member 30 can be attached to the recessed part 43 by two-sided tape or by a binder. If the bottom surface 11 is attached to the first bottom surface 43A and the bottom surface 21 is attached to the second bottom surface 43B, when the tablet terminal 1 is placed on or leaned against the level surface 2 and the wall 3, the composite elastic member 30 acts in the same way as the first and second elastic members 10, 20 of the first embodiment.

That is, in the composite elastic member 30, the first elastic member 10 mainly contacts the level surface 2 when the tablet terminal 1 is used standing on the level surface 2 in the range of a large upright angle from the level surface 2 of from the vertical to an angle of 50° or so. Conversely, the second elastic member 20 mainly contacts the level surface 2 when the tablet terminal 1 is used standing on the level surface 2 in the range of a small upright angle from the level surface 2 of an angle of 50° or so to 20° or so. Note that, the composite elastic member 30 can also have the bottom surface 11 attached to the second bottom surface 43B and the bottom surface 21 attached to the first bottom surface 43A. Further, even when the different sides of the tablet terminal 1 have no recessed parts 43, the composite elastic member 30 can be attached to the tablet terminal 1 if forming the bottom surface of the composite elastic member 30 to correspond to the shape of the part where the side surface 4S and the inclined surface 4C intersect at each side.

As explained above, according to the disclosed electronic device, there is the effect that even if operating the touch panel in a state placing the lower end part of the electronic device on the level surface and leaning the upper end part of the electronic device against a wall, the electronic device will never slip and fall against the level surface.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. An electronic device provided with a touch panel, said electronic device comprising at a housing:
   first elastic members having a first modulus of elasticity and a first coefficient of friction and contacting a level surface when said electronic device is made to stand in a range from the vertical to a first angle and
   second elastic members having a second modulus of elasticity lower that said first modulus of elasticity and a second coefficient of friction larger than said first coefficient of friction and contacting said level surface when said electronic device is made to stand by an angle of said first angle or less.

2. The electronic device according to claim 1, wherein said first elastic members and said second elastic members are provided at boundary parts of a bottom surface and side surfaces of said housing.

3. The electronic device according to claim 2, wherein said boundary parts are boundary parts in the vertical direction of said housing and boundary parts in the horizontal direction when viewing an image displayed on said touch panel from a front side of said housing.

4. The electronic device according to claim 3, wherein said first elastic members and said second elastic members are elongated shapes and are provided at adjoining positions of said side surfaces in the long directions.

5. The electronic device according to claim 4, wherein the placement positions of said second elastic members are offset with respect to the placement positions of said first elastic members in the short directions of said side surfaces.

6. The electronic device according to claim 4, wherein said first elastic members and said second elastic members are provided with projecting ridges which stick out from the flat bottom surface and to the opposite side of said bottom surface and are provided with inclined surfaces at the two sides.

7. The electronic device according to claim 5, wherein said first elastic members and said second elastic members are provided with projecting ridges which stick out from the flat bottom surface and to the opposite side of said bottom surface and are provided with inclined surfaces at the two sides.

8. The electronic device according to claim 4, wherein said first elastic members are provided with composite flat surfaces comprising flat first bottom surfaces and flat second bottom surfaces connected with said first bottom surfaces by obtuse angles and projecting ridges which stick out to the opposite sides of said composite bottom surfaces and which are provided with inclined surfaces at the two sides in the long direction, and said second elastic members are provided with flat bottom surfaces and projecting ridges which stick out from said bottom surface and which are provided with inclined surfaces at the two sides in the long direction.

9. The electronic device according to claim 5, wherein said first elastic members are provided with composite flat surfaces comprising flat first bottom surfaces and flat second bottom surfaces connected with said first bottom surfaces by obtuse angles and projecting ridges which stick out to the opposite sides of said composite bottom surfaces and which are provided with inclined surfaces at the two sides in the long direction, and said second elastic members are provided with flat bottom surfaces and projecting ridges which stick out from said bottom surface and which are provided with inclined surfaces at the two sides in the long direction.

10. The electronic device according to claim 4, wherein said first elastic members and said second elastic members are formed integrally by two-color molding so that said first elastic members and said second elastic members adjoin each other in the long directions.

11. The electronic device according to claim 5, wherein said first elastic members and said second elastic members are formed integrally by two-color molding so that said first elastic members and said second elastic members adjoin each other in the long directions.

12. The electronic device according to claim 6, wherein said first elastic members and said second elastic members are attached at their bottom surfaces to recessed parts provided at said boundary parts.

13. The electronic device according to claim 8, wherein said first elastic members and said second elastic members are attached at their bottom surfaces to recessed parts provided at said boundary parts.

14. The electronic device according to claim 6, wherein said first elastic members and said second elastic members are adhered at their bottom surfaces to said boundary parts of said housing.

15. The electronic device according to claim 8, wherein said first elastic members and said second elastic members are adhered at their bottom surfaces to said boundary parts of said housing.

16. The electronic device according to claim 2, wherein two of said first elastic members and said second elastic members are provided at each side of said electronic device.

17. The electronic device according to claim 7, wherein two of said first elastic members and said second elastic members are provided at each side of said electronic device.

18. The electronic device according to claim 1, wherein said first angle is 50°.

19. The electronic device according to claim 10, wherein said first angle is 50°.

* * * * *